United States Patent Office 2,815,343
Patented Dec. 3, 1957

2,815,343

POLYOXYALKYLENE DERIVATIVES OF PHENOTHIAZINE

Lee H. Horsley and Harold O. Seeburger, Midland, Mich., assignors to The Dow Chemical Company, Midland, Mich., a corporation of Delaware No Drawing. Application December 10, 1956, Serial No. 627,130

14 Claims. (Cl. 260—243)

This application is a continuation-in-part of our copending applications Serial Numbers 472,759 and 472,760 both filed December 2, 1954, both now abandoned.

This invention relates to polyoxyalkylene derivatives of phenothiazine and phenothiazine-5-oxide.

The compounds of the invention are N-substituted polyoxyalkylene derivatives of phenothiazine and phenothiazine-5-oxide in which the polyoxyalkylene chain is composed of oxyalkylene units formed from one or more vicinal alkylene oxides, i. e. those alkylene oxides in which the oxygen atom is bonded to each of two contiguous carbon atoms. These novel compounds correspond to the general formula:

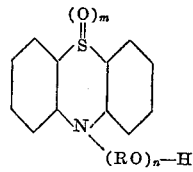

wherein $m$ is an integer from 0 to 1, —$(RO)_n$— is a polyoxyalkylene chain wherein R is the bivalent hydrocarbon residue from a member of the group of alkylene oxides consisting of ethylene oxide, propylene oxide, 1,2- and 2,3-butylene oxides, styrene oxide and mixtures thereof, and $n$ is a number in the range of 2 to 100.

The compounds are made by condensing a plurality of moles of one or more alkylene oxides with a mole of phenothiazine or phenothiazine-5-oxide, condensation occurring on the nitrogen atom of the phenothiazine nucleus. When more than one alkylene oxide is used, the oxides may be added in mixture to form a chain of randomly mixed oxyalkylene units, or they may be added separately in sequence to form a composite chain consisting of sequential groups of polyoxyalkylene units arranged in an order according to the order of addition of the respective alkylene oxides. Alkylene oxides that may be used according to the invention are ethylene oxide, propylene oxide, 1,2- and 2,3-butylene oxides, styrene oxide, and mixtures of any of them. A given product may be composed of a mixture of compounds having varying chain lengths, the average of which approximates the number of moles of oxide that are added during the reaction. Within the scope of the invention, the chain length may vary from 2 to 100 or more oxyalkylene units. In general, those products having an average of from 5 to 50 oxyalkylene units in the polyoxyalkylene chains are preferred.

The new compounds are usually prepared by reacting two or more moles of alkylene oxide with one mole of phenothiazine or phenothiazine-5-oxide. Alternatively, a polyoxyalkylene glycol may be reacted with phenothiazine or the 5-oxide.

The alkylene oxide condensation with phenothiazine or its 5-oxide is carried out under substantially moisture-free conditions at an elevated temperature in the presence of any of the usual condensation catalysts, an alkali metal hydroxide or alkoxide being preferred. The amount of catalyst employed should be at least 0.1 percent, preferably from 1 to 5 percent, by weight of the quantity of phenothiazine compound used, or from 0.1 to 1 percent by weight based on the total reactants. Reaction temperatures are in the range of about 100° to 200° C., with temperatures above 120° C. but below 170° C. preferred during most of the reaction. Superatmospheric pressures are ordinarily required, e. g. from 10 to 200 pounds per square inch, gauge. Atmospheric pressure may be used, however, when reacting an alkylene oxide, such as styrene oxide, which is normally liquid at the reaction temperature.

Since phenothiazine and its 5-oxide are solids melting at about 185° and 256° C., respectively, they may be dissolved in an inert diluent, such as benzene, toluene, or xylene, which is a common solvent both for the reactants and the reaction products. Alternatively they may be liquefied at a temperature substantially below 180° and 200° C., respectively by dissolving them in a small amount of the alkylene oxide. Once the reaction gets under way, they will remain dissolved in the reaction mixture.

A preferred method of conducting the reaction is to add the alkylene oxide, or mixed oxides, gradually to the hot liquefied phenothiazine compound, or solution thereof, and catalyst, while maintaining the whole at a reaction temperature and under sufficient pressure to maintain the liquid state. The alkylene oxide may be continuously added to the reaction vessel at a fairly rapid rate, as fast as it is reacted. By continuous rather than intermittent addition of alkylene oxide, the control of the reaction is simplified. The alkylene oxide should be substantially anhydrous, e. g. the moisture content of the oxide ordinarily should not exceed about 0.1 percent by weight. The alkylene oxide should also be as free as practical from contaminants, such as aldehydes, which give rise to side reactions and by-product formation.

The reaction is exothermic. It is therefore necessary to remove the heat of reaction by provision of adequate cooling means. When pressure is employed, it is desirable to maintain it fairly constant at some predetermined value by controlling the rate of addition of the alkylene oxide.

After all of the alkylene oxide, or mixture of oxides, have been added to the reaction vessel, the contents are maintained at a reaction temperature for a time sufficient to complete the reaction. Upon completion of the reaction, the mixture may be cooled, removed, and worked up to separate the product. In working up the reaction product, it is first neutralized, e. g. with carbon dioxide, to inactivate the alkaline catalyst, and then heated at a reduced pressure under reflux to distill off any low-boiling material, mainly unreacted alkylene oxide. Following topping under vacuum, the product, while still warm, may be filtered, if necessary, to clarify it.

The reaction may also be carried out in a continuous manner by continuously feeding the reactants into a reaction chamber under conditions of good mixing, while maintaining a reaction temperature and sufficiently long residence time to complete the reaction.

The compounds of the invention are liquids or solids, depending upon the length and composition of the polyoxyalkylene chains attached to the phenothiazine nuclei. They have good thermal stability, low vapor pressures, high flash points, good lubricating properties, and are miscible with a variety of solvents. In addition, they are stable in air, do not deposit gummy residues on heating, and are non-corrosive to metals. The compounds based largely or solely on ethylene oxide are liquid or soft, waxy solids, depending on their molecular weight. They are water soluble and have powerful surfactant properties, being useful as wetting and dispersing agents, detergents, thickening agents and textile treating agents. Those based on the other oxides are liquids characterized by low pourpoints and high viscosity indices, and useful as lubricants, hydraulic fluids, and heat transfer media. The compounds are especially useful as antioxidants, being more effective than phenothiazine or its 5-oxide in inhibiting the oxidation of petroleum oils. Quite surprisingly, these compounds also exhibit strong parasiticidal activity against fungi, insects, and bacteria.

The following examples illustrate but do not limit the scope of the invention:

EXAMPLE 1

A 500 milliliter, electrically heated, stainless steel, rocking-type autoclave equipped with a thermocouple, pressure gauge, and inlet tube was charged with 59.7 grams (0.30 mole) of phenothiazine, 150 grams of toluene, and 1.0 gram of solid sodium hydroxide. The autoclave so charged was then cooled to about 0° C., flushed with dry nitrogen gas, and additionally charged with 26.4 grams (0.60 mole) of liquid ethylene oxide. Thereupon the autoclave was closed, set to rocking, and heated to about 100° C. at which temperature the pressure rose to 49 pounds per square inch, gauge. Shortly thereafter, as reaction took place, the temperature rose to and was maintained at, about 150° C., the pressure falling off to 35 p. s. i. g. as the reaction progressed. After a reaction time of 45 minutes, the reaction mixture was quenched by cooling the autoclave and its contents to about 20° C. The crude reaction product weighing 230 grams was filtered and 16 grams of insoluble solid phenothiazine was removed. The filtrate was then neutralized with carbon dioxide and later subjected to distillation under reduced pressure to remove toluene. The residue, weighing 67 grams, was a viscous, amber-colored, water-insoluble oil, being a mixture of N-polyoxyethylene derivatives of phenothiazine having an average molecular weight of approximately 288 as calculated from the hydroxyl value, the oxyethylene chains attached to the phenothiazine nuclei therefore containing an average of approximately 2 oxyethylene units.

EXAMPLE 2

In the 500 milliliter steel autoclave of Example 1 were reacted 52.8 grams (1.20 moles) of ethylene oxide and 29.9 grams (0.15 mole) of phenothiazine dissolved in 150 grams of toluene, to which 0.5 gram of solid sodium hydroxide was added. The reaction was carried out according to the procedure of the preceding example at a temperature of about 120° C., a maximum pressure of 105 p. s. i. g. being observed. When the reaction had gone substantially to completion, the reaction product was cooled, neutralized, and topped to remove toluene by distillation under reduced pressure. The residue, weighing 82 grams, was a viscous oil of limited water solubility, being a mixture of N-polyoxyethylene derivatives of phenothiazine having an average molecular weight of approximately 530. The polyoxyethylene chains attached to the phenothiazine nuclei contained an average of approximately 8 oxyethylene units.

The above-described product was tested for fungicidal activity by spraying it in aqueous solution onto the leaves of various vegetable plants and subsequently inoculating the plants with spores of disease-producing fungi. At concentrations as low as 1 pound per 100 gallon of water, this product was found to be effective in controlling fungus diseases such as bean mildew and tomato early blight.

EXAMPLE 3

A 2-liter stainless steel autoclave equipped with a thermocouple, pressure gauge, and inlet tube was charged with 199 grams (1.0 mole) of phenothiazine and 3 grams of solid potassium hydroxide. The autoclave was then flushed with dry nitrogen gas, cooled to below 10° C., and sealed. Approximately 165 grams of liquid ethylene oxide was then introduced into the autoclave, which was placed in an electrically heated steel rocker, set to rocking, and heated slowly to about 85° C. At this temperature, the reaction began at a fast rate and the pressure rapidly dropped from a peak of about 200 pounds per square inch gauge. Thereafter the temperature was maintained at about 150° C. for approximately 1 hour until the reaction was substantially complete, i. e. until the gauge pressure had fallen off to about 0 p. s. i. The autoclave was then again cooled, evacuated of its gaseous atmosphere, and recharged with 363 grams of liquid ethylene oxide, thus bringing the total weight of ethylene oxide charged up to 528 grams (12.0 moles). The contents of the autoclave was then reacted to completion in accordance with the above described procedure, whereupon the autoclave was cooled and the liquid reaction product transferred to a flask. This product was neutralized with carbon dioxide, heated to 150° C. at a pressure of 20 millimeters of mercury absolute to remove low boiling material, and filtered while still hot. The final product was a mixture of N-polyoxyethylene derivatives of phenothiazine having an average of about 12 oxyethylene units in the polyoxyethylene chain attached to the phenothiazine nucleus. It was a viscous, amber-colored, liquid, having a water solubility at 25° C. of greater than 50 weight percent. A 10 percent solution by weight of this product had a cloud point of about 70° C., i. e. above this temperature the product was no longer soluble in water to the extent of 10 percent. This product is similar to the product of Example 2 in fungicidal activity.

EXAMPLE 4

A mixture of N-polyoxyethylene derivatives of phenothiazine having an average of about 16 oxyethylene units in the polyoxyethylene chain attached to the phenothiazine nucleus was prepared by reacting a total of 704 grams (16.0 moles) of ethylene oxide and 199 grams (1.0 mole) of phenothiazine at a temperature of about 100° C. according to the procedure of Example 3. The reaction product was a straw-colored, water-soluble soft wax having a cloud point of approximately 85° C. The water solubility of this product was greater than 50 weight percent at 25° C. This product is an effective fungicide, being similar in this respect to the products of Examples 2 and 3.

EXAMPLE 5

The autoclave employed in Example 3 was charged with 199 grams (1.0 mole) of phenothiazine, 232 grams (4.0 moles) of 1,2-propylene oxide, and 3 grams of solid potassium hydroxide. The contents were then heated at a temperature of about 150° C. in accordance with the procedure of Example 3. There was obtained a phenothiazine-polyoxypropylene reaction product having an average of about 4 oxypropylene units in each polyoxypropylene chain. This reaction product was then heated at about 135° C. with 528 grams (12.0 moles) of ethylene oxide, thereby forming polyoxyethylene extensions of the polyoxypropylene chains. The final product was a viscous amber liquid, having a water solubility of greater than 50 weight percent at 25° C. and a cloud point of approximately 65° C. in 10 weight percent water solution.

This product was tested as a detergent by standard launderometer tests and found to be as good or better than several well-known commercial detergents of the anionic type, e. g. sodium alkylarylsulfonates containing builders.

The product of Example 5 was also tested as an antioxidant for lubricating oils, e. g. low viscosity index turbine oil, and found to be superior in this respect to phenothiazine itself.

EXAMPLE 6

A total of 435 grams (7.5 moles) of 1,2-propylene oxide was reacted with 298.5 grams (1.5 moles) of phenothiazine at an average temperature of about 150° C. in the presence of 3.0 grams of KOH catalyst according to the procedure of Example 3. Based on the total charge, this represents a reactant ratio of 5 moles of 1,2-propylene oxide per mole of phenothiazine and a theoretical molecular weight of 489 for the product. After neutralizing the product with carbon dioxide and removing the low boilers by distillation at reduced pressure, the hydroxyl value of the product was determined with phthalic anhydride and an average molecular weight of 431 was calculated therefrom.

Other properties were also determined for the product, viz., the refractive index, specific gravity, cloud point, and solubilities in various solvents. These data are shown in Table I. As therein given, the cloud point is the temperature in degrees centigrade at which a 10 weight percent water solution of the product became cloudy and the solubilities are qualitative determinations of the solubility of the product in an equal part by weight of each of several named solvents at 25° C., the same being expressed as soluble (S), slightly soluble (SS), or insoluble (IS).

In addition, the product of this example was tested and found to be very effective as an aphicide at a concentration of only 0.35 weight percent. This product, similar to that of Example 5, was also found to be a good antioxidant for petroleum oils.

EXAMPLE 7

Propylene oxide weighing 580 grams (10.0 moles) was reacted with 199 grams (1.0 mole) of phenothiazine at an average temperature of 150° C. in the presence of 3 grams of KOH as catalyst and according to the procedure employed in the preceding example. The product was a dark brown viscous liquid having an average molecular weight of 610 as calculated from the hydroxyl value. This and other product data are shown in Table I.

The product of this example was also found to be a good antioxidant for lubricating oils.

EXAMPLE 8

A mixture of 504 grams (7.0 moles) of 1,2- and 2,3-butylene oxides in a weight ratio of about 9 to 1 was reacted with 278.6 grams (1.4 moles) of phenothiazine at an average temperature of about 150° C. employing 3 grams of KOH as catalyst in accordance with the general procedure of Example 3. This represents a butylene oxide to phenothiazine molar ratio of 5 to 1. The product was a light brown viscous liquid having an average molecular weight of 461 as calculated from the hydroxyl value. Physical data are shown in Table I.

EXAMPLE 9

A total of 440 grams (10.0 moles) of ethylene oxide and 79.6 grams (0.4 mole) of phenothiazine was reacted at an average temperature of about 150° C. in the presence of 2 grams of KOH catalyst according to the general procedure of Example 3. This represents a molar reactant ratio of 25 moles of ethylene oxide to 1 mole of phenothiazine. This product was a brown waxy solid having a melting point of about 33.5° C. and an average molecular weight of 1055 as calculated from the hydroxyl value. For additional physical data see Table I.

EXAMPLE 10

A mixture of alkylene oxides consisting of 199 grams (4.53 moles) of ethylene oxide and 131.5 grams (2.254 moles) of 1,2-propylene oxide was reacted with 135 grams (0.68 mole) of phenothiazine at an average temperature of about 150° C. and catalyzed with 2 grams of KOH in accordance with the procedure of Example 3. This represents a molar reactant ratio of alkylene oxides to phenothiazine of 10 to 1, the ethylene oxide to 1,2-propylene oxide molar ratio in the mixed alkylene oxides being approximately 2 to 1. The product was a light brown viscous liquid having an average molecular weight of 601 as calculated from the hydroxyl value. Additional physical data are given in Table I.

EXAMPLE 11

A mixture of alkylene oxides consisting of 94 grams (2.133 moles) of ethylene oxide 247.5 grams (4.266 moles) of 1,2-propylene oxide was reacted to completion with 127 grams (0.64 mole) of phenothiazine in the presence of 2 grams of KOH catalyst at an average temperature of about 140° C. according to the method of Example 3. Based on the reactants charged, this represents a molar reactant ratio of alkylene oxides to phenothiazine of 10 to 1, the mole ratio of ethylene oxide to 1,2-propylene oxide in the mixed oxides being 1 to 2. This product was a light brown viscous liquid having an average molecular weight as calculated from the hydroxyl value of 616. Other physical properties are contained in Table I.

*Table I*

PRODUCTS MADE FROM PHENOTHIAZINE

| Product of Ex. No. | Mole Ratio of Alkylene Oxide to Phenothiazine Compound | | | Mol. Wt., Theory | Mol. Wt., from percent OH | Hydroxyl Value, percent OH | Sulfur, Content, percent | $N_D^{25}$ | Specific Gravity, 25/25 | Cloud Point, 10% aqueous solution, °C. | 50 Wt. Percent Solubilities | | | | | | |
|---|---|---|---|---|---|---|---|---|---|---|---|---|---|---|---|---|---|
| | E. O. | P. O. | B. O. | | | | | | | | water | acetone | methanol | benzene | CCl₄ | xylene | n-Heptane |
| 6 | | 5 | | 489 | 431 | 3.95 | | 1.5557 | 1.115 | | IS | S | S | S | S | S | SS |
| 7 | | 10 | | 779 | 610 | 2.79 | | 1.5150 | 1.073 | | IS | S | S | S | S | S | S |
| 8 | | | 5 | 560 | 461 | 3.69 | | 1.5435 | 1.080 | | IS | S | S | S | S | S | S |
| 9 | 25 | | | 1,300 | 1,055 | 1.615 | | solid | solid | 96 | S | S | S | S | S | S | IS |
| 10 | 6.7 | 3.3 | | 680 | 601 | 2.83 | | 1.5348 | 1.133 | 26 | S | S | S | S | S | S | IS |
| 11 | 3.3 | 6.7 | | 727 | 616 | 2.76 | | 1.5238 | 1.103 | <0 | IS | S | S | S | S | S | IS |

PRODUCTS MADE FROM PHENOTHIAZINE-5-OXIDE

| 14 | 10 | | | 655 | 520 | 3.27 | 4.75 | 1.5510 | 1.185 | 50 | S | S | S | S | SS | SS | IS |
| 15 | 15 | | | 875 | 635 | 2.68 | 3.74 | solid | solid | 77 | S | S | S | S | S | SS | IS |
| 16 | 7 | 5 | | 813 | 600 | 2.84 | 3.82 | 1.5287 | 1.123 | 50 | S | S | S | S | S | S | IS |
| 17 | 14.3 | 5 | | 1,113 | | | | | | 70 | S | S | S | S | | | |
| 18 | | | 5 | 505 | 412 | 4.13 | 6.41 | 1.5684 | | | IS | IS | IS | S | S | S | IS |
| 19 | | | 5 | 575 | 397 | 4.29 | 5.56 | 1.5515 | | | IS | SS | IS | SS | S | S | IS |
| 20 | 5 | 5 | | 725 | 457 | 3.72 | 4.26 | 1.5355 | | <0 | IS | S | S | S | S | S | IS |

Legend.—E. O.=ethylene oxide; P. O.=propylene oxide; B. O.=butylene oxide; S=soluble; SS=slightly soluble; IS=insoluble.
Solubilities determined at 25° C.
For additional information, see Example 6.

EXAMPLE 12

Into a two liter glass flask equipped with a water-cooled reflux condenser and motor-driven stirrer were charged 199 grams (1.0 mole) of phenothiazine, 120 grams (1.0 mole) of styrene oxide, and 4 grams of solid KOH. Thereupon the contents of the flask were heated to 130° C. at which temperature the reaction began to proceed rapidly, raising the temperature of the mixture to about 180° C. After the reaction had progressed for some time at this temperature, more styrene oxide was gradually added under conditions of good mixing until an additional 480 grams (4.0 moles) had been reacted during a period of 4.5 hours. Following the reaction, a portion of the product was neutralized with carbon dioxide and filtered to clarify it. This product was a dark reddish brown tacky solid having a theoretical molecular weight of 800.

EXAMPLE 13

A 311 gram portion of the reaction product of Example 12 prior to neutralization was charged into a two liter glass flask equipped with a motor-driven stirrer and a reflux condenser cooled with Dry Ice. On heating the contents of the flask to about 180° C., ethylene oxide was bubbled into the agitated mixture until 512 grams (11.65 moles) had been reacted. Following the reaction, the product was neutralized with carbon dioxide and filtered. This product was a dark reddish brown viscous liquid having a theoretical molecular weight of 2100.

EXAMPLE 14

A 2000 milliliter, electrically heated, steel, rocking-type autoclave equipped with a thermocouple, pressure gauge, and inlet tube was charged with 215 grams (1.0 mole) of phenothiazine-5-oxide and 3 grams of solid potassium hydroxide. The autoclave was then flushed with dry nitrogen gas, sealed, and placed in an electrically heated steel rocker, set to rocking, and heated slowly to about 100° C. Thereupon liquid ethylene oxide was gradually introduced into the autoclave until a total of 440 grams (10.0 moles) had been added. Throughout the addition of ethylene oxide the temperature was maintained at about 100° to 130° C. and the pressure at about 10 to 50 pounds per square inch gauge. Even after the ethylene oxide had all been added, agitation was continued until the reaction was substantially complete, i. e. until the gauge pressure had fallen off to about 0 p. s. i. The autoclave was then cooled and the liquid reaction product transferred to a flask. This product was neutralized with carbon dioxide, heated to 150° C. at a pressure of 20 millimeters of mercury absolute to remove low boiling material, and filtered while still hot. The final product was a brown viscous oil which, upon analysis, was found to have a sulfur content of 4.75 weight percent and a hydroxyl value, as determined with phthalic anhydride, of 3.27 percent. This product was a mixture of N-polyoxyethylene derivatives of phenothiazine-5-oxide having an average molecular weight of approximately 520 as calculated from the hydroxyl value. Other properties were also determined for the product, viz., the refractive index, specific gravity, cloud point, and solubilities in various solvents. All of these data are shown in Table I.

The above-described product was tested for fungicidal activity by spraying it in aqueous solution onto the leaves of various vegetable plants and subsequently inoculating the plants with spores of disease-producting fungi. At concentrations as low as 1 pound per 100 gallons of water, this product was found to be effective in controlling fungus diseases such as bean mildew and tomato early blight.

EXAMPLE 15

A total of 660 grams (15.0 moles) of ethylene oxide and 215 grams (1.0 mole) of phenothiazine-5-oxide were heated at an average temperature of about 130° C. in the presence of 3 grams of solid potassium hydroxide for approximately 5 hours according to the procedure of Example 1. The final reaction product was a soft, waxy solid, being a mixture of N-polyoxyethylene derivatives of phenothiazine-5-oxide having an average molecular weight of approximately 635 as calculated from the hydroxyl value. These and other properties are given in Table I. This product is similar to the product of the preceding example in fungicidal activity.

EXAMPLE 16

The autoclave employed in the foregoing examples was charged with 215 grams (1.0 mole) of phenothiazine-5-oxide, 290 grams (5.0 moles) of 1,2-propylene oxide, and 3 grams of solid potassium hydroxide. The contents were then heated for 1.5 hours at a temperature of about 150° C. in accordance with the procedure of Example 1. There was obtained an N-polyoxypropylene-phenothiazine-5-oxide reaction product, i. e. the polyoxypropylene chains were attached to the nitrogen atoms of the phenothiazine-5-oxide nuclei. This reaction product in its entirety was then heated to about 150° C. and a total of 308 grams (7.0 moles) of ethylene oxide was gradually added, thereby forming polyoxyethylene extensions of the polyoxypropylene chains. The final product was a dark brown liquid, having an average molecular weight of approximately 600. This product was found to be an effective fungicide, being similar in this respect to the products of Examples 1 and 2. Its properties are given in Table I.

EXAMPLE 17

A product similar to that described in the preceding example was prepared according to the same procedure. Approximately 215 grams (1.0 mole) of phenothiazine-5-oxide, 290 grams (5.0 moles) of 1,2-propylene, and 3 grams of KOH were heated at a temperature of about 130° C. until reaction was substantially complete, thereby forming polyoxypropylene chains on the nitrogen atoms of the phenothiazine-5-oxide nuclei. This reaction product was then maintained at a temperature of about 130° C. while 629 grams (14.3 moles) of ethylene oxide was gradually added thereto, thereby forming polyoxyethylene extensions of the polyoxypropylene chains. The final product was a water-soluble amber viscous oil, having a theoretical molecular weight of 1113. This product was found to have fungicidal activity similar to the products of the preceding examples. The properties of the product of this example are given in Table I.

EXAMPLE 18

Propylene oxide weighing 290 grams (5.0 moles) was reacted with 215 grams (1.0 mole) of phenothiazine-5-oxide at an average temperature of about 150° C. in the presence of 2 grams of KOH as catalyst and according to the procedure employed in the preceding example. The product was a dark brown viscous liquid having an average molecular weight of 412 as calculated from the hydroxyl value. Other product data are shown in Table I.

EXAMPLE 19

A mixture of 540 grams (7.5 moles) of 1,2- and 2,3-butylene oxides in a weight ratio of about 9 to 1 was reacted with 323 grams (1.5 moles) of phenothiazine-5-oxide at an average temperature of about 160° C. employing 4.5 grams KOH catalyst and in accordance with the procedure of Example 1. This represents a butylene oxide to phenothiazine-5-oxide molar ratio of 5 to 1. The product was a dark brown viscous liquid having an average molecular weight of 397 as calculated from the hydroxyl value. Product data are shown in Table I.

EXAMPLE 20

A mixture of alkylene oxides consisting of 264 grams (6.0 moles) of ethylene oxide and 348 grams (6.0 moles) of 1,2-propylene oxide was reacted with 258 grams (1.2 moles) of phenothiazine-5-oxide at an average temperature of about 160° C. in the presence of 4 grams of KOH and in accordance with the procedure of Example 1. This represents a molar ratio of alkylene oxide to phenothiazine-5-oxide of 10 to 1, the ethylene oxide and 1,2-propylene being present in the mixed alkylene oxides in an equimolecular proportion. The product was a dark brown viscous liquid having an average molecular weight of 457 as calculated from the hydroxyl value. Additional properties are given in Table I.

The product of Example 7 was tested and found to be an effective antioxidant for lubricating oils, e. g. low viscosity index turbine oil, being superior in this respect to phenothiazine.

EXAMPLE 21

Styrene oxide weighing 300 grams (2.5 moles) was reacted with 108 grams (0.5 mole) of phenothiazine-5-oxide in the presence of 2 grams of potassium hydroxide and in accordance with the procedure of Example 3. The reaction was carried out by heating the reactants in a rocking-type steel autoclave at a temperature of about 150° C. for four hours. The N-polyoxyphenylethylene-phenothiazine-5-oxide product was a dark brown glassy substance having a theoretical molecular weight of 815.

We claim:

1. Compounds having the formula

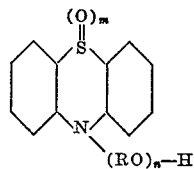

wherein $m$ is an integer from 0 to 1, —$(RO)_n$— is a polyoxyalkylene chain wherein R is the bivalent hydrocarbon residue of an alkylene oxide selected from the group consisting of ethylene, propylene, butylene and styrene oxides and mixtures thereof and $n$ is a number in the range of 2 to 100.

2. Compounds as defined in claim 1 wherein the alkylene oxide is ethylene oxide and $n$ is an integer from 5 to 50.

3. Compounds as defined in claim 1 wherein the alkylene oxide is propylene oxide and $n$ is an integer from 5 to 50.

4. Compounds as defined in claim 1 wherein the alkylene oxide is a butylene oxide and $n$ is an integer from 5 to 50.

5. Compounds as defined in claim 1 wherein the alkylene oxide is 1,2-butylene oxide and $n$ is an integer from 5 to 50.

6. Compounds as defined in claim 1 wherein the alkylene oxide is styrene oxide and $n$ is an integer from 5 to 50.

7. Compounds as defined in claim 1 wherein the alkylene oxide is a mixture of alkylene, oxides selected from the group consisting of ethylene, propylene, butylene and styrene oxides.

8. Compounds as defined in claim 7 wherein the mixture of alkylene oxides is a mixture of ethylene and propylene oxides.

9. Compounds as defined in claim 8 wherein the polyoxyalkylene chain, —$(RO)_n$—, has the formula $$-(R_1O)_x-(R_2O)_y-$$

wherein $R_1$ and $R_2$ are species of R, one of them being the ethylene radical and the other being the 1,2-propylene radical and $x$ and $y$ are numbers such that $x+y=n$.

10. Compounds as defined in claim 9 wherein $R_1$ is the 1,2-propylene radical and $R_2$ is the ethylene radical.

11. Compounds as defined in claim 2 wherein $m$ is 1.
12. Compounds as defined in claim 3 wherein $m$ is 1.
13. Compounds as defined in claim 6 wherein $m$ is 1.
14. Compounds as defined in claim 10 wherein $m$ is 1.

References Cited in the file of this patent
FOREIGN PATENTS
129,843     Sweden _____ Oct. 24, 1950